(12) United States Patent
Medvedev et al.

(10) Patent No.: US 12,436,099 B2
(45) Date of Patent: Oct. 7, 2025

(54) SYSTEM AND METHOD FOR MEASURING COMPONENT CONCENTRATION

(71) Applicant: NINOX MEDICAL LTD., Ein Ayala (IL)

(72) Inventors: Dmitry Medvedev, Moscow (RU); Roman Iliev, Moscow (RU)

(73) Assignee: NINOX MEDICAL LTD., Ein Ayala (IL)

( * ) Notice: Subject to any disclaimer, the term of this patent is extended or adjusted under 35 U.S.C. 154(b) by 107 days.

(21) Appl. No.: 18/266,027

(22) PCT Filed: Dec. 9, 2021

(86) PCT No.: PCT/IL2021/051472
§ 371 (c)(1),
(2) Date: Jun. 8, 2023

(87) PCT Pub. No.: WO2022/123574
PCT Pub. Date: Jun. 16, 2022

(65) Prior Publication Data
US 2024/0094117 A1    Mar. 21, 2024

Related U.S. Application Data

(60) Provisional application No. 63/123,167, filed on Dec. 9, 2020.

(51) Int. Cl.
*G01N 21/3504* (2014.01)
(52) U.S. Cl.
CPC .............................. *G01N 21/3504* (2013.01)
(58) Field of Classification Search
CPC ............. G01N 21/3504; G01N 21/255; G01N 21/031; G01N 2201/0668; G01N 21/33
See application file for complete search history.

(56) References Cited

U.S. PATENT DOCUMENTS

| 5,502,308 A | 3/1996 | Wong |
| 5,973,326 A | 10/1999 | Parry et al. |

(Continued)

FOREIGN PATENT DOCUMENTS

| CN | 212008310 U | 11/2020 |
| DE | 202019101137 U1 | 3/2019 |

(Continued)

OTHER PUBLICATIONS

PCT International Search Report for International Application No. PCT/IL2021/051472, mailed Mar. 10, 2022, 3pp.

(Continued)

*Primary Examiner* — David P Porta
*Assistant Examiner* — Gisselle M Gutierrez
(74) *Attorney, Agent, or Firm* — The Roy Gross Law Firm, LLC; Roy Gross (57) ABSTRACT

A method for measuring component concentration in a sample, the method constituted of: passing light through a sample from a first light source to a first light sensor; measuring a first light intensity of light received at the first light sensor; passing light through the sample from a second light source to a second light sensor at the first light intensity; measuring a second light intensity of light received at the second light sensor; determining an adsorption level based on a difference in intensity from light emitted from the first light source and the second light intensity; and calculating a component concentration in the sample based on the adsorption level and a total optical length of light passed between the first light source and sensor and the second light source and sensor.

19 Claims, 7 Drawing Sheets

(56) References Cited

U.S. PATENT DOCUMENTS

| | | | |
|---|---|---|---|
| 10,101,320 B2 * | 10/2018 | Rihani | G01N 21/27 |
| 10,876,893 B2 * | 12/2020 | Brunson | G02B 19/0028 |
| 11,073,478 B2 * | 7/2021 | Ferguson | G01N 21/66 |
| 2007/0182965 A1 | 8/2007 | Kamlet et al. | |
| 2011/0153213 A1 * | 6/2011 | Buchanan | B09C 1/105 |
| | | | 703/2 |
| 2011/0299084 A1 | 12/2011 | Feitisch et al. | |
| 2024/0027336 A1 * | 1/2024 | Medvedev | G01N 33/0027 |

FOREIGN PATENT DOCUMENTS

| | | |
|---|---|---|
| EP | 1080364 B1 | 3/2001 |
| JP | S57144447 A | 9/1982 |
| JP | 2006226727 A | 8/2006 |
| JP | 2016125951 A | 7/2016 |
| JP | 6487214 B2 | 3/2019 |
| JP | 2019074521 A | 5/2019 |
| KR | 101736107 B1 | 5/2017 |

OTHER PUBLICATIONS

PCT Written Opinion for International Application No. PCT/IL2021/051472, mailed Mar. 10, 2022, 6pp.

PCT International Preliminary Report on Patentability for International Application No. PCT/IL2021/051472, issued Jun. 13, 2023, 7pp.

\* cited by examiner

FIG.1

*PRIOR ART*

FIG. 2A

*PRIOR ART*

SYSTEM AND METHOD FOR MEASURING COMPONENT CONCENTRATION

CROSS REFERENCE TO RELATED APPLICATIONS

The present application is a National Phase of PCT Patent Application No. PCT/IL2021/051472 having International filing date of Dec. 9, 2021, which claims the benefit of priority from U.S. patent application Ser. No. 63/123,167, filed Dec. 9, 2020, and entitled "Optical Sensing", the entire contents of which are all incorporated herein by reference.

TECHNICAL FIELD

The present disclosure relates to the measurement of admixture concentrations through light adsorption.

BACKGROUND

There are many methods used for the analysis of gas and liquid compositions including gas and liquid chromatography and mass spectroscopy. Chromatography methods based on differences in adsorption of various admixtures offer advantages including the ability to detect small concentrations in gas and liquid admixtures with high selectivity. Mass spectroscopy utilizes a mass spectrometer to identify particles present in a substance. The particles are ionized and passed through an electromagnetic field. The manner in which the particles are deflected is indicative of their mass, and thus their identity. Both chromatography and mass spectroscopy are accurate methods but require the use of expensive and complicated equipment. Also, those methods are relatively slow, making them unsuitable for real time analysis of compositions. For example, such methods are impractical for real-time analysis of exhalations in medical applications.

Electrochemical-based analysis systems use an electrochemical gaseous sensor in which gas from a sample diffuses into and through a semi-permeable barrier, such as membrane, then through an electrolyte solution, and then to one of typically three electrodes. At one of the three electrodes, a sensing redox reaction occurs. At the second, counter, electrode, a complimentary and opposite redox reaction occurs. A third electrode is typically provided as a reference electrode. Upon oxidation, or reduction, of the admixture component (e.g., nitric oxide) at the sensing electrode, a current flow can be measured between the sensing and counter electrode that is proportional to the amount of substance reacting at the sensing electrode surface. The reference electrode is used to maintain the sensing electrode at a fixed voltage. Electrochemical-based devices have high sensitivity and accuracy, but require frequent calibration and servicing. Also, this method has a problem with selectivity with respect to small concentrations of measured admixtures.

The most convenient and reliable of gas analysis methods is direct optical measurement of gas components by adsorption of light at various wavelengths. The main advantage of this method is the stability of adsorption in time because the adsorption coefficient is a fundamental constant. Accordingly, such gas analyzers don't need frequent calibration and provide stable measurements as long as the optics are kept clean. Current gas analyzers 10 based on light adsorption (see FIG. 1) consist of: a light source 20 which generates radiation on a wavelength which is adsorbed by the gas component to be measured; an optical cuvette 25 to allow light to pass through the contained gas, the optical cuvette comprising a sealing 26 and optical window 27 on each end; a gas input 30; a gas output 40; and a light sensor 50, fed by a lens 55, which can transform the light passed through the gas from the light source 20 into a voltage signal. Suitable light sources 20 include LEDs and laser diodes and suitable light sensors 50 include photo diodes, photo resistors, or phototransistors which have practically unlimited service lifetimes and sufficiently stable characteristics.

SUMMARY

Accordingly, it is a principal object of the present invention to overcome at least some of the disadvantages of prior art plasma generation systems. This is provided in one embodiment by a system for measuring component concentration in a sample, the system comprising: a container for containing the sample; a first light source positioned to emit light through the sample in the container; a first light sensor positioned to receive light from the first light source that has passed through the sample in the container; a second light source positioned to emit light through the sample in the container; a second light sensor positioned to receive light from the second light source that has passed through the sample in the container; and a control circuitry in communication with the first light sensor and the second light source light sensor, the control circuitry configured to: receive a light intensity measurement from the first light sensor; cause the second light source to emit light based on the received light intensity; receive a light intensity from the second light sensor; determine an adsorption level based on a difference in intensity from the light emitted from the first light source and the light received at the second light sensor; and calculate a component concentration in the sample based on the adsorption level and a total optical length of light passed between the first light source and sensor and the second light source and sensor.

In one embodiment, the system further comprises one or more additional light sources and light sensors, wherein the control circuitry is configured to: emit light from each successive light source based on an intensity measured in each preceding light sensor; determine an adsorption level based on a difference in intensity from the light emitted from an initial light source and the light received at a final light sensor; and calculate a component concentration in the sample based on the adsorption level and a total optical length of light passed between each light source and sensor.

In another embodiment, one or more of the first or second sensors or sources are within the container in contact with the sample.

In one embodiment, the container comprises one or more transparent portions, wherein one or more of the first or second sensors or sources are positioned outside of the container to direct or receive light through the one or more transparent portions.

In another embodiment, the container comprises an inlet and outlet to allow sample to flow into and out of the container.

In one embodiment, the component concentration is the concentration of $NO_2$.

In another embodiment, the first light source emits light having a wavelength of about 350 nm to about 400 nm.

In one embodiment, the first light source comprises one or more light emitting diodes or laser diodes.

In another embodiment, the first light sensor comprises one or more photo diodes, photo resistors, or phototransistors.

In one embodiment, the light emitted from the second light source is equal in intensity to the received light intensity.

In another embodiment, the light emitted from the second light source is stronger in intensity than the received light intensity.

In one embodiment, the light emitted from the second light source is weaker in intensity than the received light intensity.

In one independent embodiment, a method for measuring component concentration in a sample is provided, the method comprising: passing light through a sample from a first light source to a first light sensor; measuring a first light intensity of light received at the first light sensor; passing light through the sample from a second light source to a second light sensor at the first light intensity; measuring a second light intensity of light received at the second light sensor; determining an adsorption level based on a difference in intensity from light emitted from the first light source and the second light intensity; and calculating a component concentration in the sample based on the adsorption level and a total optical length of light passed between the first light source and sensor and the second light source and sensor.

In one embodiment, the method further comprises: emitting light from each of one or more successive light sources based on an intensity measured in each of one or more preceding light sensors; determining an adsorption level based on a difference in intensity from the light emitted from an initial light source and the light received at a final light sensor; and calculating a component concentration in the sample based on the adsorption level and a total optical length of light passed between each light source and sensor.

In another embodiment, one or more of the first or second sensors or sources are within a container in contact with the sample.

In one embodiment, the sample is in a container comprising one or more transparent portions, wherein one or more of the first or second sensors or sources are positioned outside of the container to direct or receive light through the one or more transparent portions.

In another embodiment, the container comprises an inlet and outlet, the method further comprising flowing the sample into and out of the container through the inlet and outlet.

In one embodiment, the component concentration is the concentration of $NO_2$.

In another embodiment, the first light source emits light having a wavelength of about 350 nm to about 400 nm.

In one embodiment, the first light source comprises one or more light emitting diodes or laser diodes.

In another embodiment, the first light sensor comprises one or more photo diodes, photo resistors, or phototransistors.

In one embodiment, the light emitted from the second light source is equal in intensity to the received light intensity.

In another embodiment, the light emitted from the second light source is stronger in intensity than the received light intensity.

In one embodiment, the light emitted from the second light source is weaker in intensity than the received light intensity.

Additional features and advantages of the invention will become apparent from the following drawings and description.

Unless otherwise defined, all technical and scientific terms used herein have the same meaning as commonly understood by one of ordinary skill in the art to which this invention pertains. In case of conflict, the patent specification, including definitions, governs. As used herein, the articles "a" and "an" mean "at least one" or "one or more" unless the context clearly dictates otherwise. As utilized herein, "and/or" means any one or more of the items in the list joined by "and/or". As an example, "x and/or y" means any element of the three-element set {(x), (y), (x, y)}. In other words, "x and/or y" means "x, y or both of x and y". As another example, "x, y, and/or z" means any element of the seven-element set {(x), (y), (z), (x, y), (x, z), (y, z), (x, y, z)}.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed devices and/or methods.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF CERTAIN EMBODIMENTS

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

Figure 1:
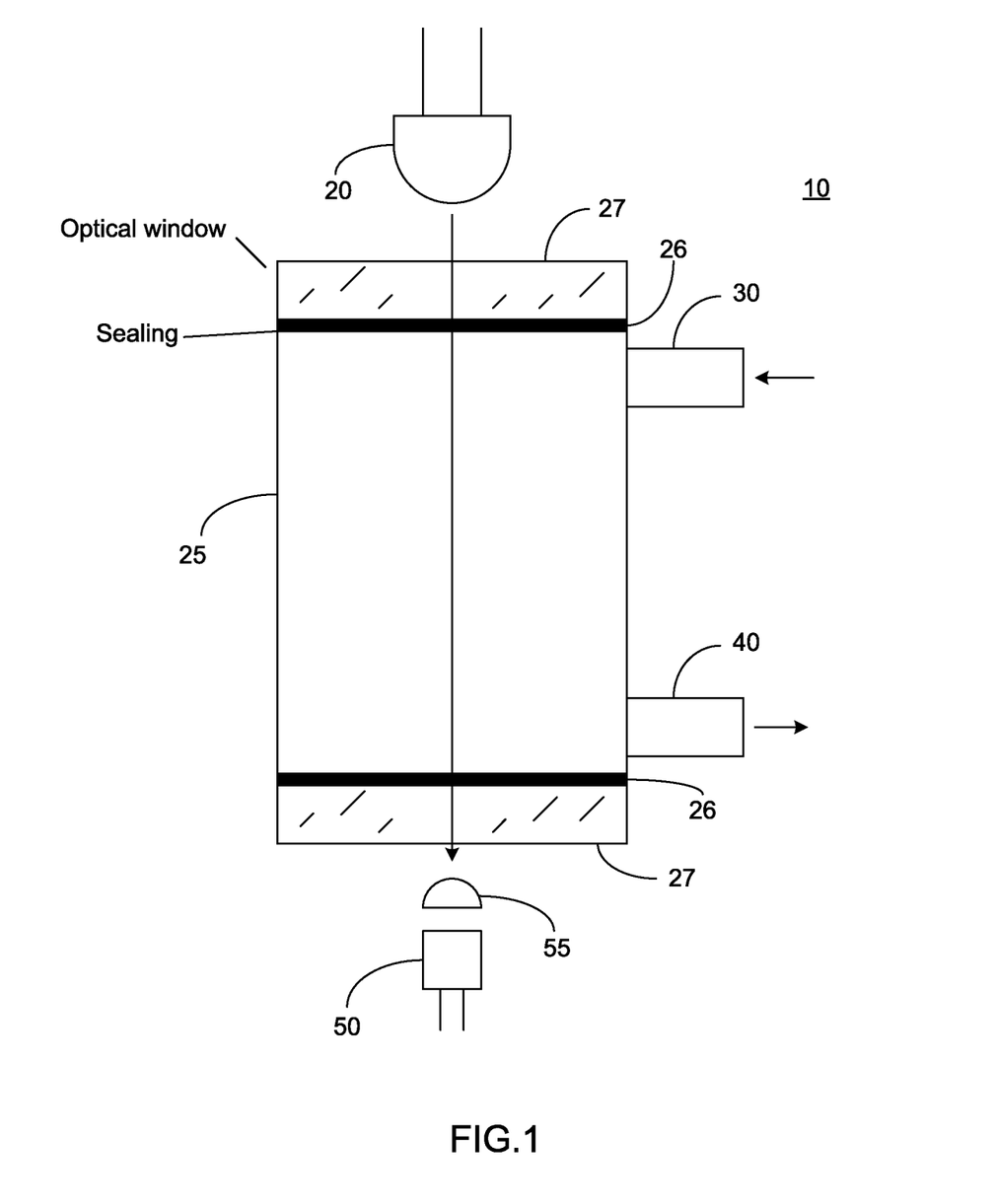
FIG. 1 shows a light-adsorption-based concentration sensor, in accordance with the prior art.

One potential drawback with light adsorption systems, such as system 10 of FIG. 1, is in measuring small concentrations. That shortcoming can be addressed by extending the optical length of the light passing through the gas. Because the light passes through a greater amount of the subject gas, the adsorption can be increased to readily measurable amounts even with small concentrations. Increasing the optical length can be accomplished by increasing the size of the optical cuvette containing the subject gas and through which the light is passed. However, increasing the size of the optical cuvette can pose packaging problems. Optical length can also be increased without increasing the size of the optical cuvette by reflecting the light through the subject gas multiple times using mirrors (See FIGS. 2A-2B).

Figure 2A:
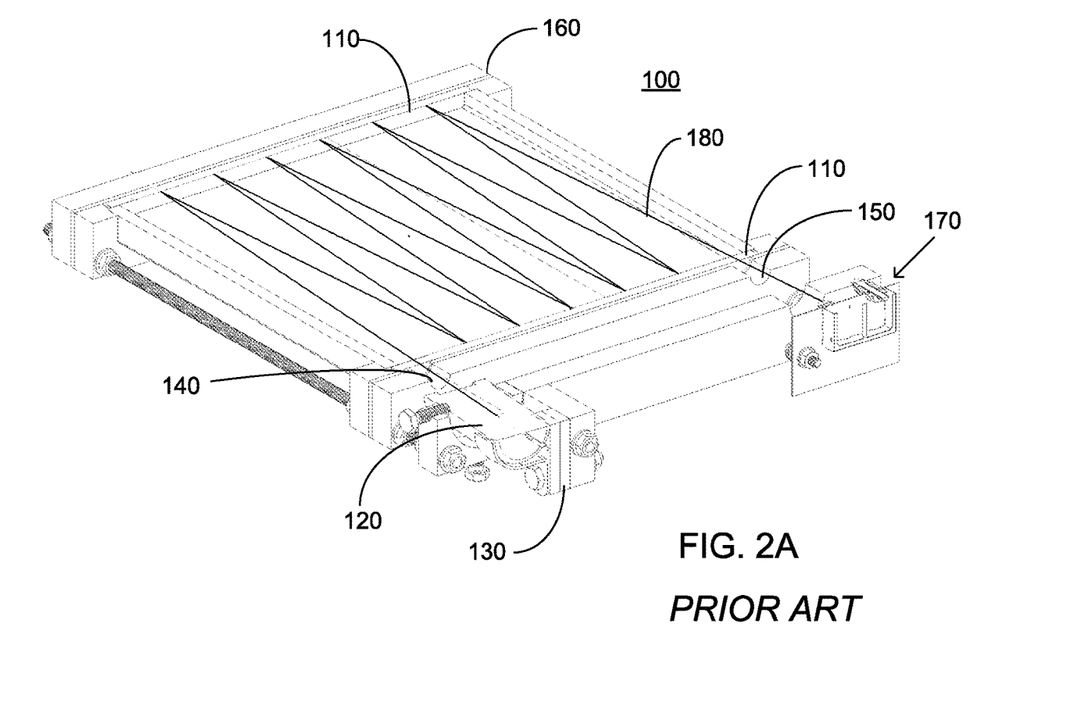
FIGS. 2A-2B show an exemplary sensor comprising parallel mirrors for increased optical beam length, in accordance with the prior art.
Figure 2B:
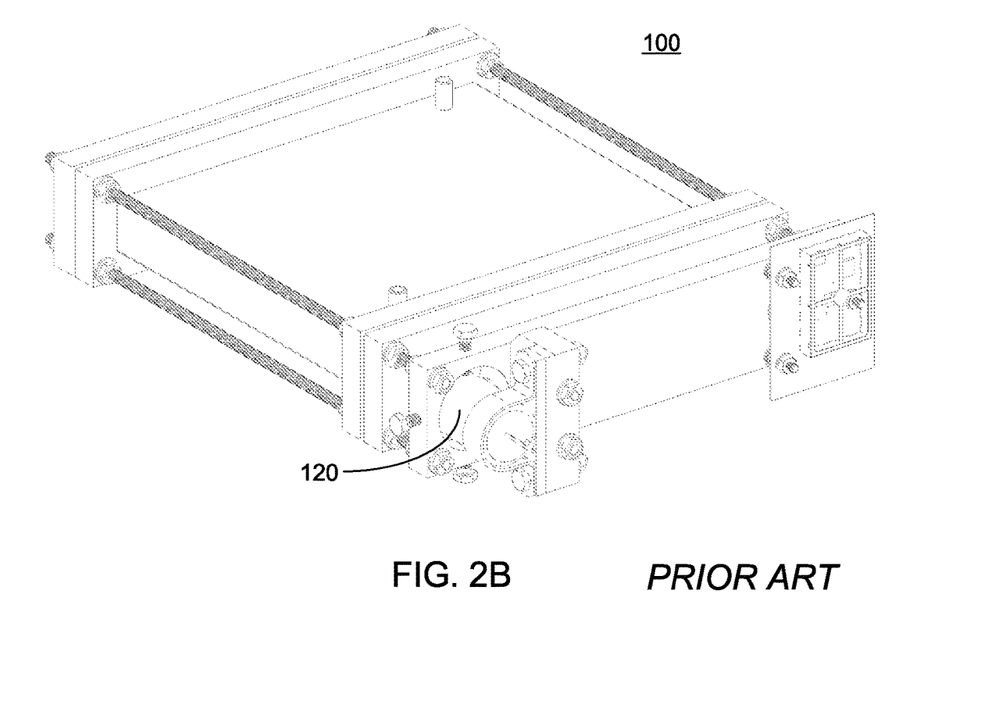

FIG. 2A illustrates a cut-away view of a multi-pass optical cuvette system 100 and FIG. 2B illustrates a perspective view of cuvette 100. Cuvette system 100 comprises: a pair of mirrors 110, opposing each other; a light source 120, optionally a laser; a laser adjustment system 130; a beam input channel 140; a beam output channel 150; a sealing 160; and a light sensor 170. The laser beam 180 enters through the beam input channel 140, and is reflected multiple times between mirrors 110, until exiting via beam output channel 150 to be measured by light sensor 170. Using mirrors 110, it is possible to increase the sensitivity to lower concentrations multiple times but optical length and sensitivity of such a cuvette system 100 is limited by laser beam divergence. Natural beam divergence and accumulation of errors during serial beam reflections limit the maximal optical length that can be reached in such a device.

Systems and methods of the disclosure address that shortcoming by providing one or more electronic mirrors consisting of a light sensor and light source unit. Each light sensor can receive and measure intensity of light from a preceding light source in the chain and then reemit light from a linked light source at that measured intensity. The process can be repeated as many times as required to achieve the desired optical length and the cumulative adsorption can be measured as the total diminishment of intensity from the first light source in the chain to the last light sensor in the chain.

The chain of light sources and sensors can be linked through electronic circuits such that each successive light source emits light at an intensity proportional, stronger than proportional, or weaker than proportional to the intensity of the light received at the preceding light sensor. Light sensors and sources can be directly linked and controlled through basic circuitry or may be in communication with a computing system comprising a processor and memory and configured to receive various intensity measurements from light sensors and direct proportional light emission from various light sources.

Aspects of the disclosure may include a system for measuring component concentration in a sample. Such systems may include a container for containing the sample; a first light source positioned to emit light through the sample in the container; a first light sensor positioned to receive light from the first light source that has passed through the sample in the container; a second light source positioned to emit light through the sample in the container; a second light sensor positioned to receive light from the second light source that has passed through the sample in the container; and a processor or control circuitry in communication with the first light sensor and the second light source light sensor. The processor or control circuitry can be configured to: receive a light intensity measurement from the first light sensor; cause the second light source to emit light based on the received light intensity; receive a light intensity from the second light sensor; determine an adsorption level based on a difference in intensity from the light emitted from the first light source and the light received at the second light sensor; and calculate a component concentration in the sample based on the adsorption level and a total optical length of light passed between the first light source and sensor and the second light source and sensor.

The term "control circuitry", as used herein, includes any suitable circuitry, including, but not limited to, a processor.

In certain embodiments, systems may further comprise one or more additional light sources and light sensors wherein the processor is configured to emit light from each successive light source based on an intensity measured in each preceding light sensor, determine an adsorption level based on a difference in intensity from the light emitted from an initial light source and the light received at a final light sensor, and calculate a component concentration in the sample based on the adsorption level and a total optical length of light passed between each light source and sensor.

One or more of the first or second sensors or sources may be positioned within the container in contact with the sample. In certain embodiments, the container may comprise one or more transparent portions, wherein one or more of the first or second sensors or sources are positioned outside of the container to direct or receive light through the one or more transparent portions. The container can include an inlet and outlet to allow the sample to flow into and out of the container. The component concentration may be the concentration of Nitrogen dioxide ($NO_2$). The first light source may emit light at a wavelength of about 350 nm to about 400 nm.

In various embodiments, the first light source may comprise one or more light emitting diodes or laser diodes. The first light sensor may comprise one or more photo diodes, photo resistors, or phototransistors. The light emitted from the second light source may be equal in intensity, stronger in intensity, or weaker in intensity to the received light intensity.

Aspects of the disclosure may include methods for measuring component concentration in a sample. Such methods may include passing light through a sample from a first light source to a first light sensor; measuring a first light intensity of light received at the first light sensor; passing light through the sample from a second light source to a second light sensor at the first light intensity; measuring a second light intensity of light received at the second light sensor; determining an adsorption level based on a difference in intensity from light emitted from the first light source and the second light intensity; and calculating a component concentration in the sample based on the adsorption level and a total optical length of light passed between the first light source and sensor and the second light source and sensor.

In certain embodiments, methods may further include emitting light from each of one or more successive light sources based on an intensity measured in each of one or more preceding light sensors; determining an adsorption level based on a difference in intensity from the light emitted from an initial light source and the light received at a final light sensor; and calculating a component concentration in the sample based on the adsorption level and a total optical length of light passed between each light source and sensor.

Systems and methods of the disclosure relate to measuring sample component concentration through light adsorption. As noted, direct optical measurements of gas components by adsorption of light at certain wavelengths provides convenient and reliable gas analysis for a variety of applications including many in the medical and industrial fields. The main advantages of such methods are stability of adsorption in time because the adsorption coefficient is fundamentally constant but such methods are limited in their ability to detect smaller concentrations, especially where space constraints limit optical beam length passing through the sample. Physical beam manipulation (e.g., using mirrors) to increase optical length face shortcomings related to beam divergence.

Systems and methods of the disclosure address the prior shortcomings by providing multi-pass sensors that rely on a series of connected light sensors and sources to pass light through the sample multiple times (thereby virtually extending the optical length) while measuring the cumulative diminishment in intensity to determine adsorption. The wavelength of the emitted light can be selected as one that is adsorbed by the target gas component and the light sensor can measure the light intensity after the emitted light has passed through the gas. Thus, the adsorption and associated gas component concentration can be determined. Light sources may include readily available LEDs or laser diodes and light sensors can be selected from photo diodes, photo resistors, or phototransistors, all of which have practically unlimited lifetimes and stable characteristics.

Figure 3:
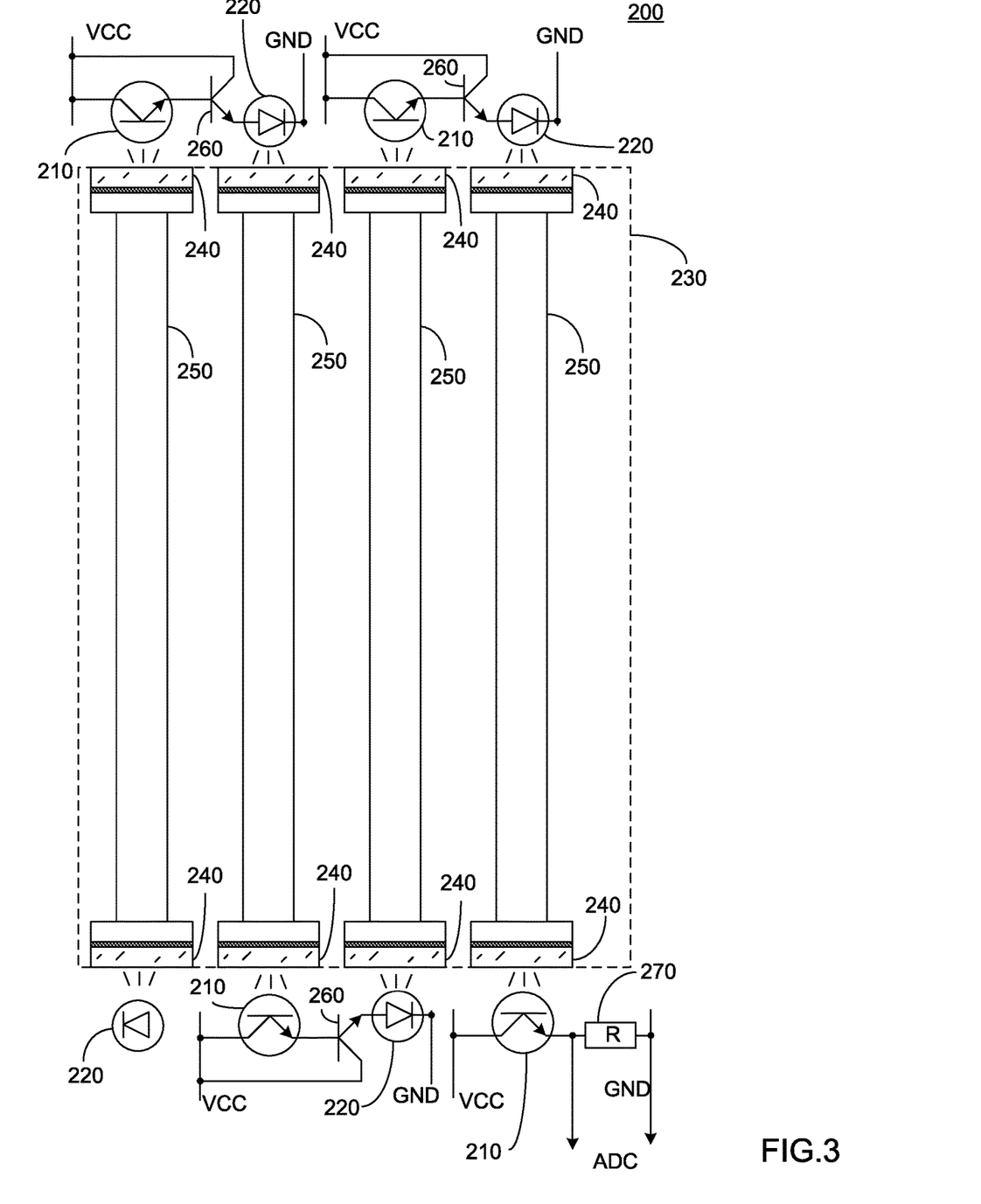
FIG. 3 shows an exemplary light-adsorption-based sensor using a series of successive light sensors and sources for electronically increasing optical beam length, in accordance with some embodiments of the disclosure.

An exemplary system 200 of the disclosure is depicted in FIG. 3. A series of electronically linked light sensors 210 and light sources 220 are positioned on opposite sides of a container 230 in which a sample is contained. In one embodiment, each light sensor 210 is implemented as a phototransistor (PT). In another embodiment, each light source 220 is implemented as one or more light-emitting diodes (LEDs). A series of transparent windows 240 allow light to pass into and out of the container 230 between successive sources 220 and sensors 210. In one embodiment, system 200 further comprises a plurality of cuvettes 250, each arranged between a pair of transparent windows 240, the pair of transparent windows 240 positioned on opposing sides of container 230. Although system 200 is illustrated as comprising a plurality of cuvettes 250, this is not meant to be limiting in any way, and system 200 can operate similarly without cuvettes 250. In one embodiment (not shown for simplicity), container 230 comprises an inlet and an outlet, as described above in relation to cuvette system 100 and analyzer 10

In one embodiment, an output of each sensor 210 controls an input of a respective source 220. In one example, an emitter of each sensor 210 is coupled to a base of a respective transistor 260 and an emitter of the respective transistor 260 is coupled to an anode of the respective source 220. In one embodiment, an output of the ultimate sensor 210 is coupled to an input of an analog to digital converter (ADC), via a resistor 270.

The systems and methods of the disclosure are particularly useful in measuring sample components with concentrations in the ppb range with quick response time. As with regular multi pass cuvettes (e.g., mirrored embodiments as shown in FIGS. 2A-2B), increased optical lengths are achieved but, instead of physically folding the light beam in a small container many times, systems and methods of the disclosure can use serial reemission of light by LED's installed in the beginning of each separate cuvette.

In some embodiments, the light intensity of each source 220 is proportional to the light intensity of previous sensor 210 or cuvette driven by current amplification circuits using transistors or other current amplifiers. Accordingly, all cuvettes 250 function as one cuvette with any optical length determined by quantity of serial cuvettes 250 which can be as long as needed while still allowing for compact packaging. Systems and methods of the disclosure do not require complicated and precise optical service and adjustment procedures. Such cuvettes 250 work as regular optical cuvettes (requiring simply routine cleaning and maintenance) but with practically unlimited optical length.

Figure 4:
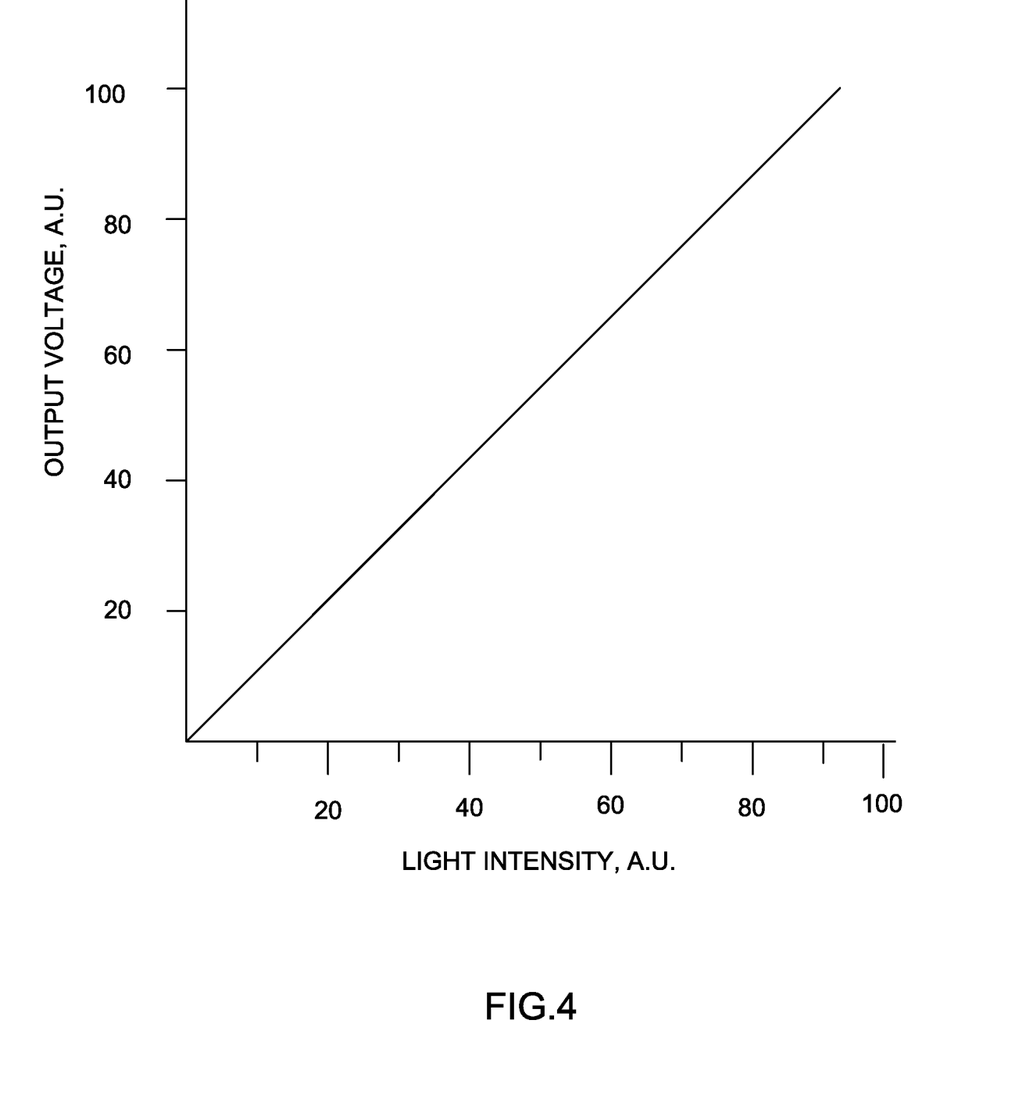
FIG. 4 illustrates a proportional relationship between measured and emitted light intensity, in accordance with some embodiments of the disclosure.

In certain embodiments, light intensity of each source 220 may not be directly proportional to the light intensity of the previous sensor or cuvette but may have a stronger than proportional relationship. The relationship can be, for example, exponentially or linearly dependent starting from a non-zero point of x-axis or other strong dependence, as shown in FIG. 4. The relationship between successive light sensors 210 and sources 220 may be governed through simple electronic circuits or via computer systems according to programmed algorithms. Current amplification with stronger than proportional dependence allows for increased sensitivity but with a narrower dynamic region of measured concentrations.

Figure 5:
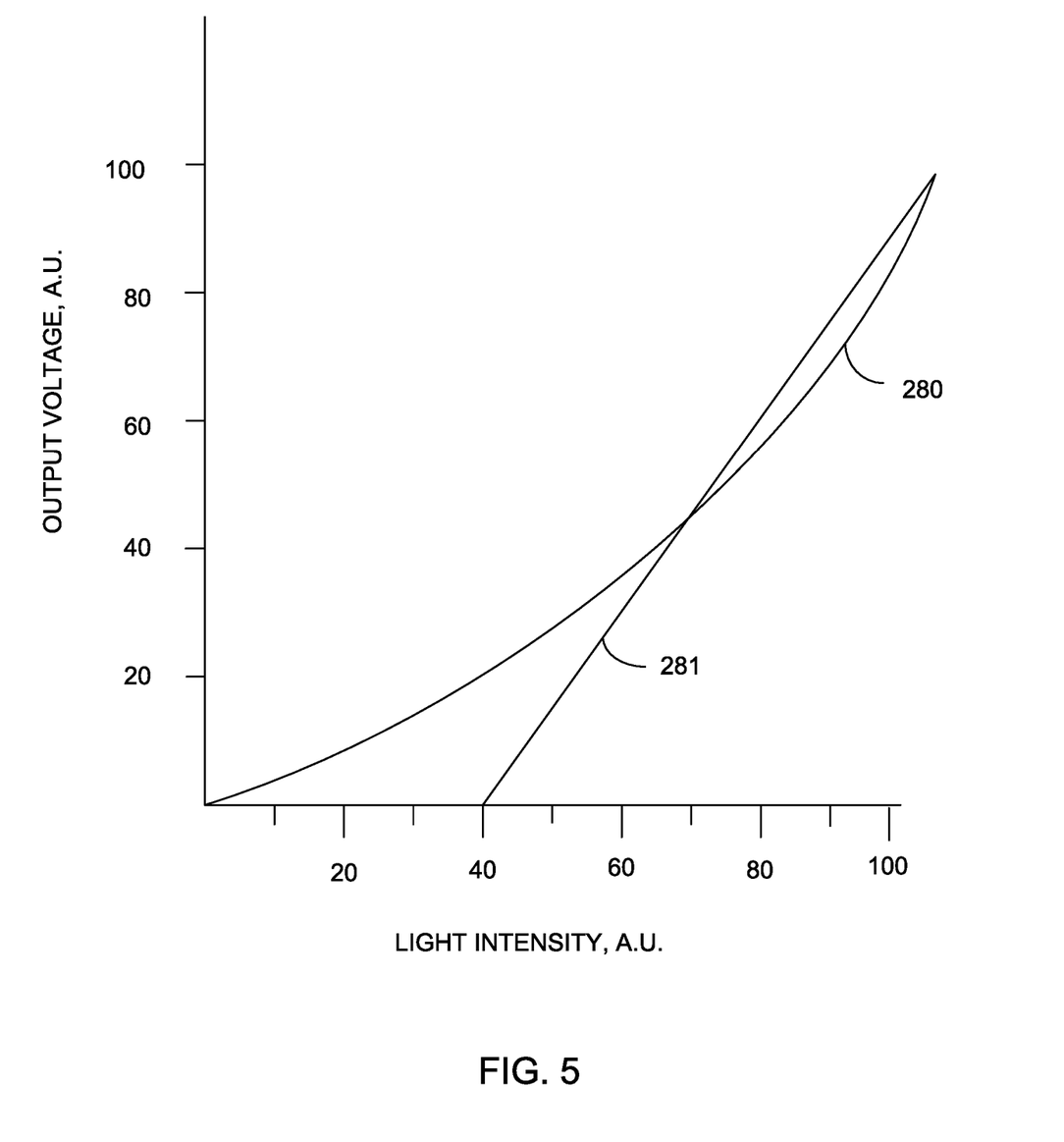
FIG. 5 illustrates a stronger than proportional relationship between measured and emitted light intensity, in accordance with some embodiments of the disclosure.
Figure 6:
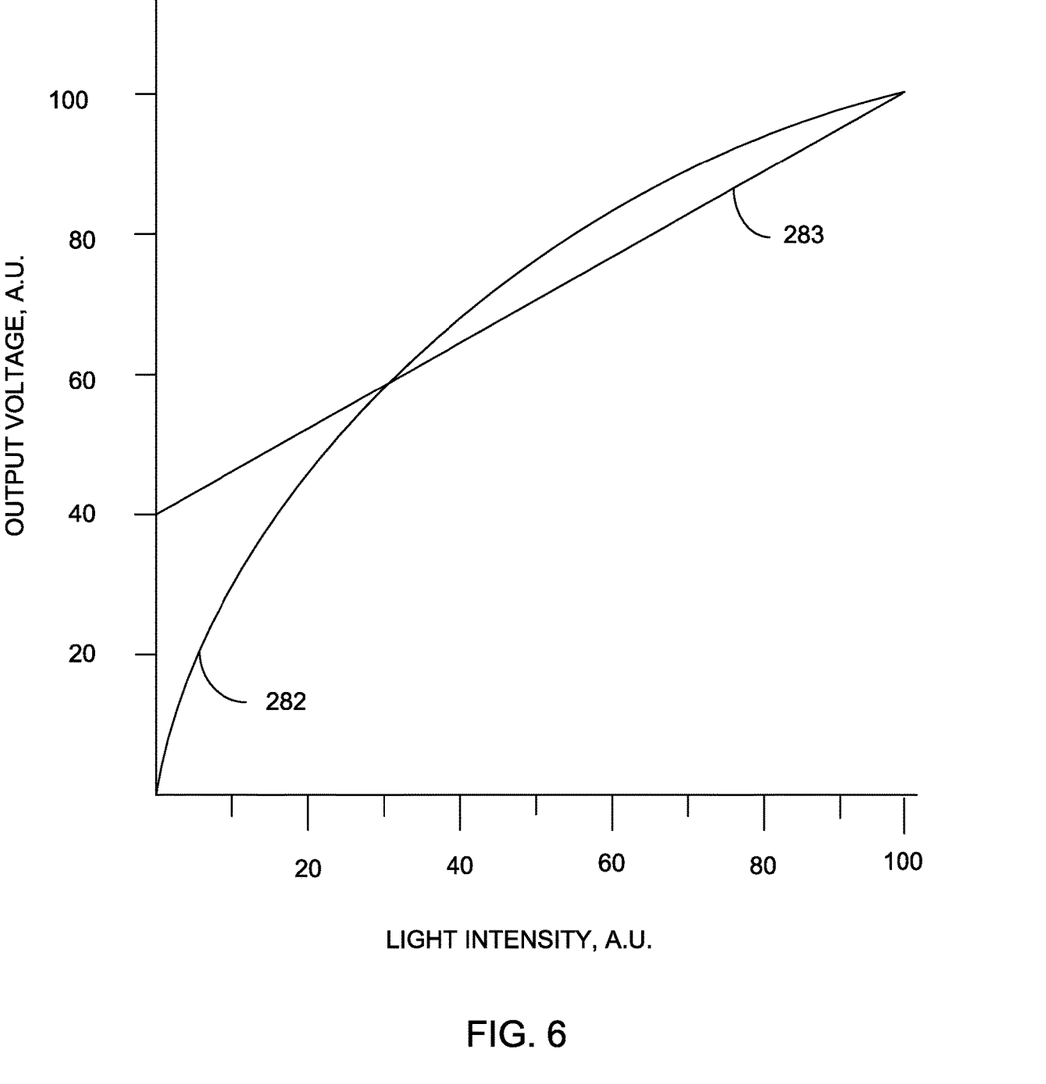
FIG. 6 illustrates a weaker than proportional relationship between measured and emitted light intensity, in accordance with some embodiments of the disclosure.

In some embodiments, light intensity of each source 220 may not be directly proportional to the light intensity of the previous cuvette or sensor but may have a weaker than proportional relationship. The relationship can be, for example, curved (as shown by curve 280) or linearly dependence starting from non-zero point of the x-axis (as shown by line 281) or other weak dependence, as shown in FIG. 5. Alternatively, light intensity of each source 220 may have a stronger than proportional relationship, as shown in FIG. 6, such as logarithmically (as shown by curve 282) or linearly dependence starting from a non-zero point of the y-axis (as shown by line 283).

Figure 7:
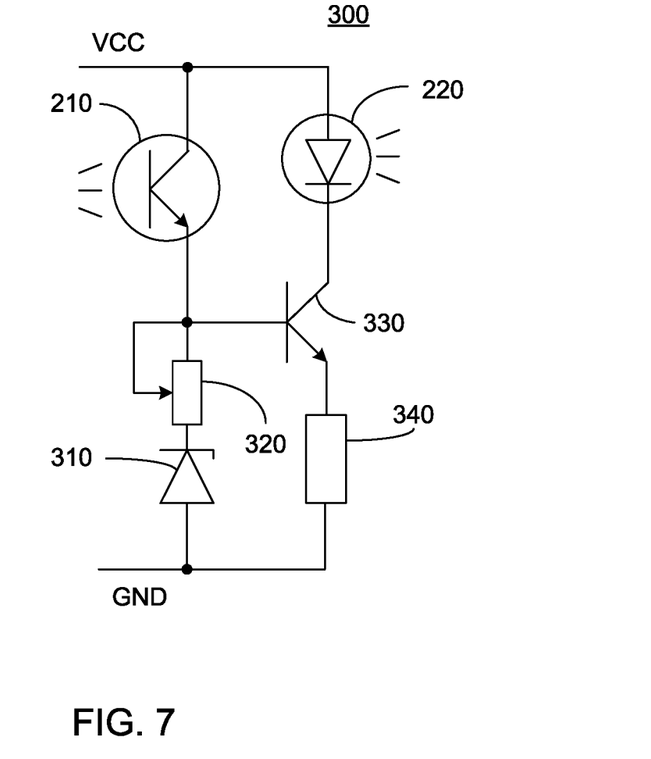
FIG. 7 shows an exemplary circuit for relating measured and emitted light, in accordance with some embodiments of the disclosure.

The relationship may be governed by current amplification circuits using transistors or other current amplifiers as shown, for example, in FIG. 7. Particularly, FIG. 7 shows an amplification circuit 300 comprising: a Zener diode 310; a resistor 320; a bipolar junction transistor 330; and a resistor 340. An anode of the Zener diode 310 is coupled to common potential and a cathode of the Zener diode 310 is coupled to a first end of resistor 320. A second end of resistor 320 is coupled to a base of transistor 330 and to an emitter of a photo transistor 210. A collector of transistor 330 is coupled to a cathode of LED 220 and an emitter of transistor 330 is coupled to the common potential via resistor 340. In one embodiment, resistor 320 is an adjustable resistor, and a control terminal of resistor 320 is coupled to the emitter of PD 210. Thus, the dependence is responsive to the Zener voltage of Zener diode 310. Particularly, whether the Zener voltage is equal to, less than, or greater than, the base-emitter voltage of transistor 330 will determine the dependence between LED 220 and PD 210.

Current amplification with weaker than proportional dependence provides a decreased sensitivity but a wider dynamic region of measured concentrations. Exemplary sensitivities and ranges for the various strategies are discussed in the examples below.

EXAMPLES

Example 1

Ozone in air analyzer
Gas flow rate: 4-40 l/hour
Multi pass optical cuvette with optical length 4 m consisting of eight 0.5 m sections using a series of directly proportionally linked sensors and light sources.
LED wavelength of light sources: 265 nm
Measurement range: 10 ppb-2 ppm Example 2

Ozone in water analyzer
Water flow rate: 0.4-4 l/hour
Multi pass optical cuvette with optical length 4 m consisting of eight 0.5 m sections using a series of directly proportionally linked sensors and light sources.
LED's wavelength: 265 nm
Measurements region 10 ppb-2 ppm Example 3

Ozone in air analyzer
Gas flow rate: 4-40 l/hour
Multi pass optical cuvette with optical length 4 m consisting of eight 0.5 m sections using a series of stronger than proportionally linked sensors and light sources.
LED's wavelength: 265 nm
Measurements region 1 ppb-50 ppb Example 4

Ozone in air analyzer
Gas flow rate: 4-40 l/hour
Multi pass optical cuvette with optical length 4 m consisting of eight 0.5 m sections using a series of weaker than directly proportionally linked sensors and light sources.
LED's wavelength: 265 nm
Measurements region 20 ppb-100 ppm Example #5

Nitrogen dioxide in air analyzer
Gas flow rate: 4-40 l/hour
Multi pass optical cuvette with optical length 4 m consisting of eight 0.5 m sections using a series of directly proportionally linked sensors and light sources.
LED's wavelength: 405 nm
Measurements region 40 ppb-8 ppm As one skilled in the art would recognize as necessary or best-suited for the systems and methods of the disclosure, systems and methods of the disclosure may include computing devices that may include one or more of processor (e.g., a central processing unit (CPU), a graphics processing unit (GPU), etc.), computer-readable storage device (e.g., main memory, static memory, etc.), or combinations thereof which communicate with each other via a bus. Computing devices may include mobile devices (e.g., cell phones), personal computers, and server computers. In various embodiments, computing devices may be configured to communicate with one another via a network.

Computing devices may be used to control the systems described herein including operation of valves and pumps and processing of sensor data from NO sensors, and filter-related sensors.

A processor may include any suitable processor known in the art, such as the processor sold under the trademark XEON E7 by Intel (Santa Clara, CA) or the processor sold under the trademark OPTERON 6200 by AMD (Sunnyvale, CA).

Memory preferably includes at least one tangible, non-transitory medium capable of storing: one or more sets of instructions executable to cause the system to perform functions described herein (e.g., software embodying any methodology or function found herein); data (e.g., data to be encoded in a memory strand); or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Any suitable services can be used for storage such as, for example, Amazon Web Services, cloud storage, another server, or other computer-readable storage. Cloud storage may refer to a data storage scheme wherein data is stored in logical pools and the physical storage may span across multiple servers and multiple locations. Storage may be owned and managed by a hosting company. Preferably, storage is used to store records as needed to perform and support operations described herein.

Input/output devices according to the disclosure may include one or more of a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof. Input/output devices may be used to enter desired NO concentration levels and flow rates and to alert users regarding sensor readings and the need for filter replacement.

One of skill in the art will recognize that any suitable development environment or programming language may be employed to allow the operability described herein for various systems and methods of the disclosure. For example, systems and methods herein can be implemented using C++, C#, Java, JavaScript, Visual Basic, Ruby on Rails, Groovy and Grails, or any other suitable tool. For a computing device, it may be preferred to use native xCode or Android Java.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A system for measuring component concentration in a sample, the system comprising:
    a container for containing the sample;
    a first light source positioned to emit light through the sample in the container;
    a first light sensor positioned to receive light from the first light source that has passed through the sample in the container;
    a second light source positioned to emit light through the sample in the container;
    a second light sensor positioned to receive light from the second light source that has passed through the sample in the container; and
    a control circuitry in communication with the first light sensor and the second light source light sensor, the control circuitry configured to:
        receive a light intensity measurement from the first light sensor;
        cause the second light source to emit light based on the received light intensity;
        receive a light intensity from the second light sensor;
        determine an adsorption level based on a difference in intensity from the light emitted from the first light source and the light received at the second light sensor; and
    calculate a component concentration in the sample based on the adsorption level and a total optical length of light passed between the first light source and sensor and the second light source and sensor.

2. The system of claim 1, further comprising one or more additional light sources and light sensors, wherein the control circuitry is configured to:
    emit light from each successive light source based on an intensity measured in each preceding light sensor;
    determine an adsorption level based on a difference in intensity from the light emitted from an initial light source and the light received at a final light sensor; and
    calculate a component concentration in the sample based on the adsorption level and a total optical length of light passed between each light source and sensor.

3. The system of claim 1, wherein one or more of the first or second sensors or sources are within the container in contact with the sample.

4. The system of claim 1, wherein the container comprises one or more transparent portions, wherein one or more of the first or second sensors or sources are positioned outside of the container to direct or receive light through the one or more transparent portions.

5. The system of claim 1, wherein the component concentration is the concentration of Nitrogen dioxide ($NO_2$).

6. The system of claim 5, wherein the first light source emits light having a wavelength of about 350 nm to about 400 nm.

7. The system of claim 1, wherein the first light source comprises one or more light emitting diodes or laser diodes.

8. The system of claim 1, wherein the first light sensor comprises one or more photo diodes, photo resistors, or phototransistors.

9. A method for measuring component concentration in a sample, the method comprising:
    passing light through a sample from a first light source to a first light sensor;
    measuring a first light intensity of light received at the first light sensor;
    passing light through the sample from a second light source to a second light sensor at the first light intensity;
    measuring a second light intensity of light received at the second light sensor;
    determining an adsorption level based on a difference in intensity from light emitted from the first light source and the second light intensity; and
    calculating a component concentration in the sample based on the adsorption level and a total optical length of light passed between the first light source and sensor and the second light source and sensor.

10. The method of claim 9, further comprising:
    emitting light from each of one or more successive light sources based on an intensity measured in each of one or more preceding light sensors;
    determining an adsorption level based on a difference in intensity from the light emitted from an initial light source and the light received at a final light sensor; and
    calculating a component concentration in the sample based on the adsorption level and a total optical length of light passed between each light source and sensor.

11. The method of claim 9, wherein one or more of the first or second sensors or sources are within a container in contact with the sample.

12. The method of claim 9, wherein the sample is in a container comprising one or more transparent portions, wherein one or more of the first or second sensors or sources are positioned outside of the container to direct or receive light through the one or more transparent portions.

13. The method of claim 9, wherein the component concentration is the concentration of Nitrogen Dioxide ($NO_2$).

14. The method of claim 13, wherein the first light source emits light having a wavelength of about 350 nm to about 400 nm.

15. The method of claim 9, wherein the first light source comprises one or more light emitting diodes or laser diodes.

16. The method of claim 9, wherein the first light sensor comprises one or more photo diodes, photo resistors, or phototransistors.

17. The method of claim 9, wherein the light emitted from the second light source is equal in intensity to the received light intensity.

18. The method of claim 9, wherein the light emitted from the second light source is stronger in intensity than the received light intensity.

19. The method of claim 9, wherein the light emitted from the second light source is weaker in intensity than the received light intensity.

* * * * *